Oct. 14, 1924.  
J. C. FINDLAY  
SPRAYING APPARATUS FOR LIVE STOCK  
Original Filed April 15, 1920  
1,511,450  
5 Sheets-Sheet 4
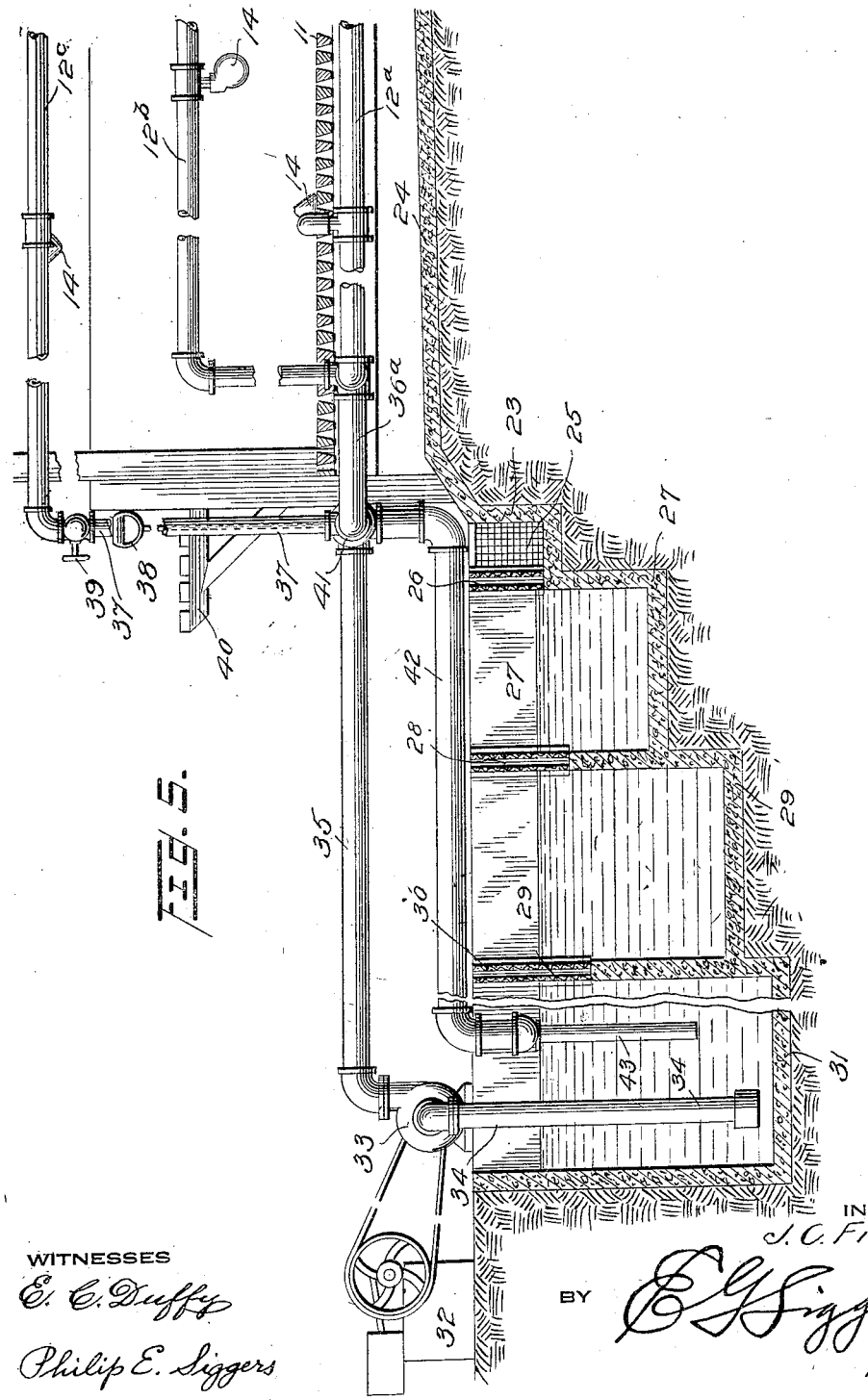
WITNESSES  
E. C. Duffy  
Philip E. Siggers  
INVENTOR  
J. C. Findlay  
BY E. G. Siggers  
ATTORNEY

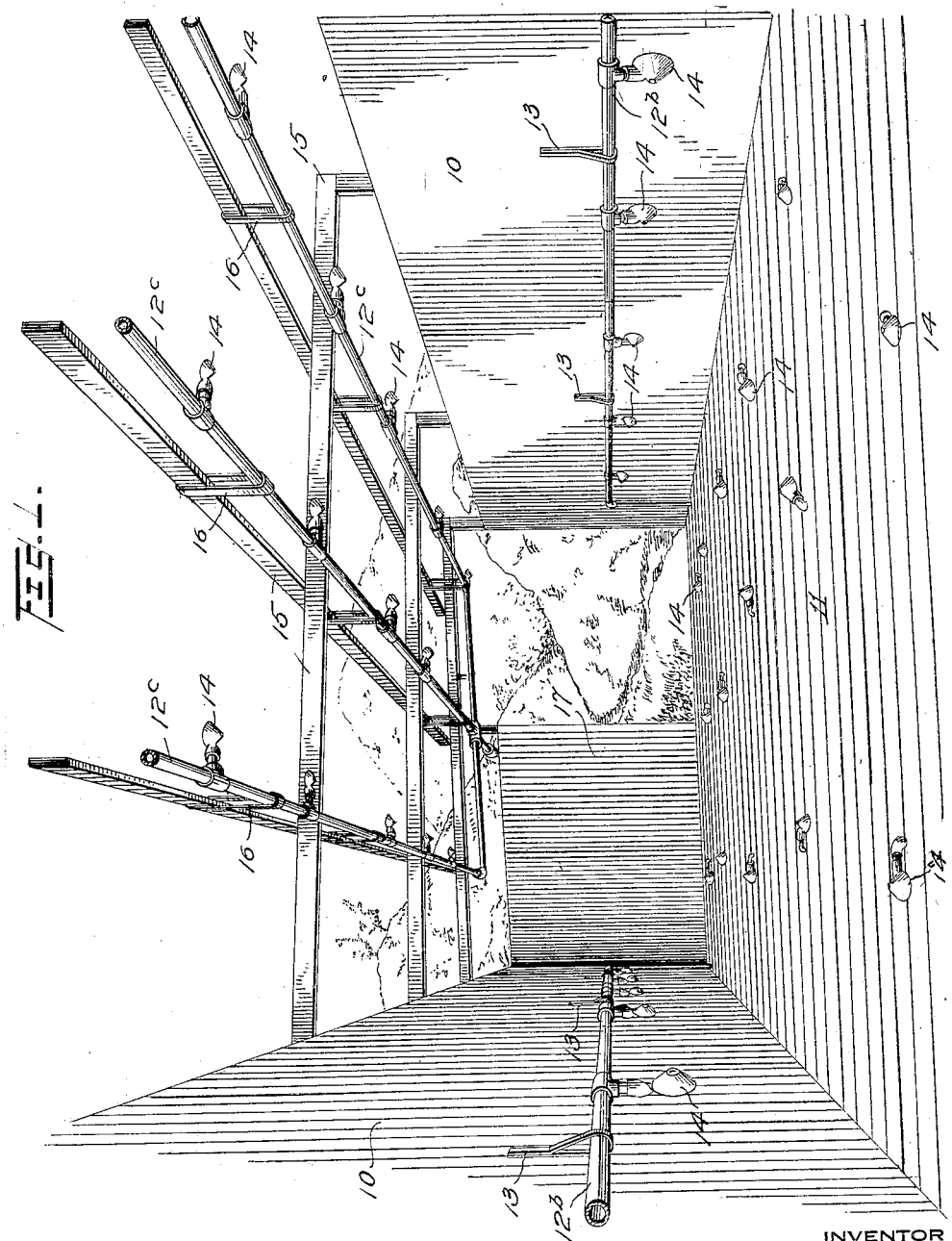

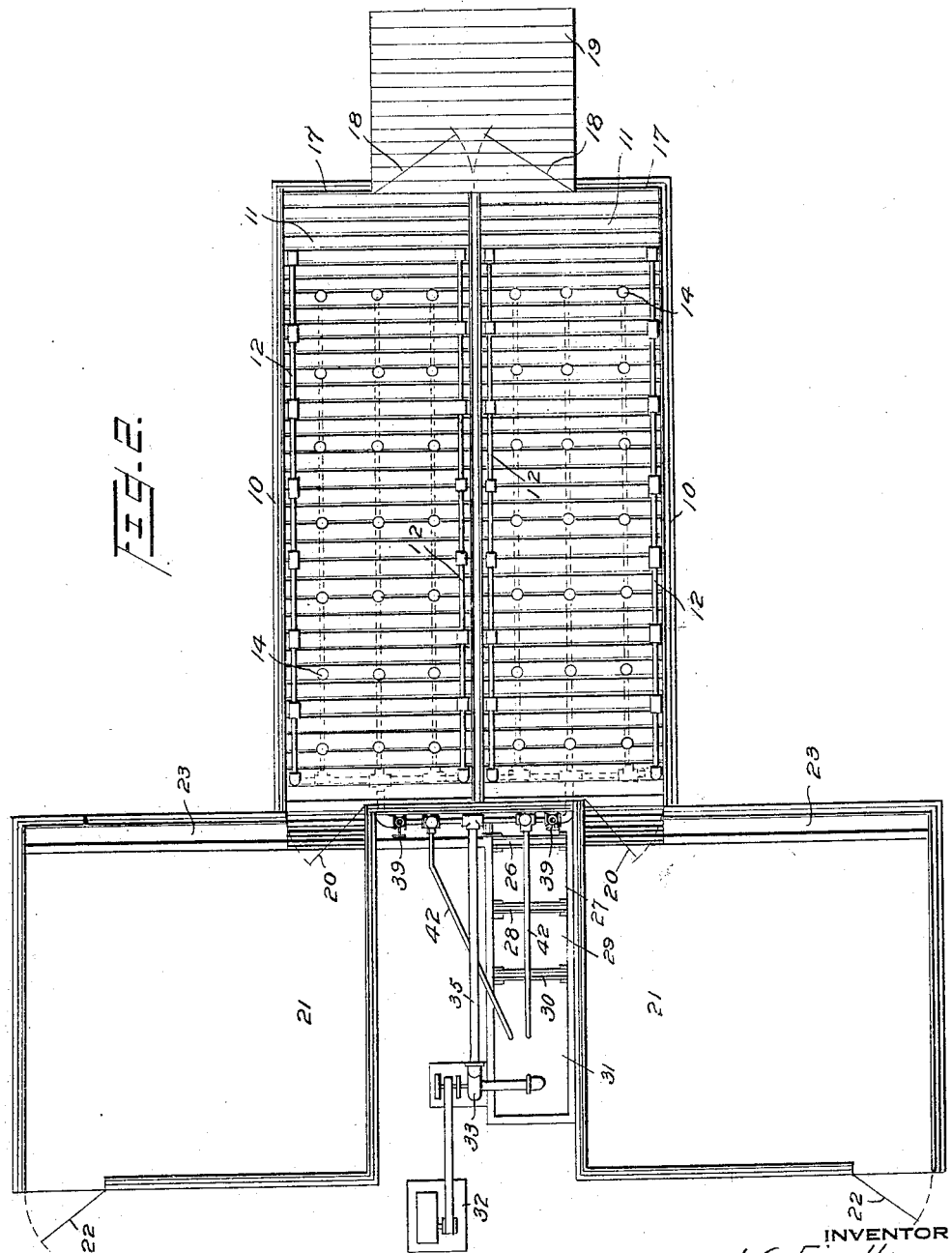

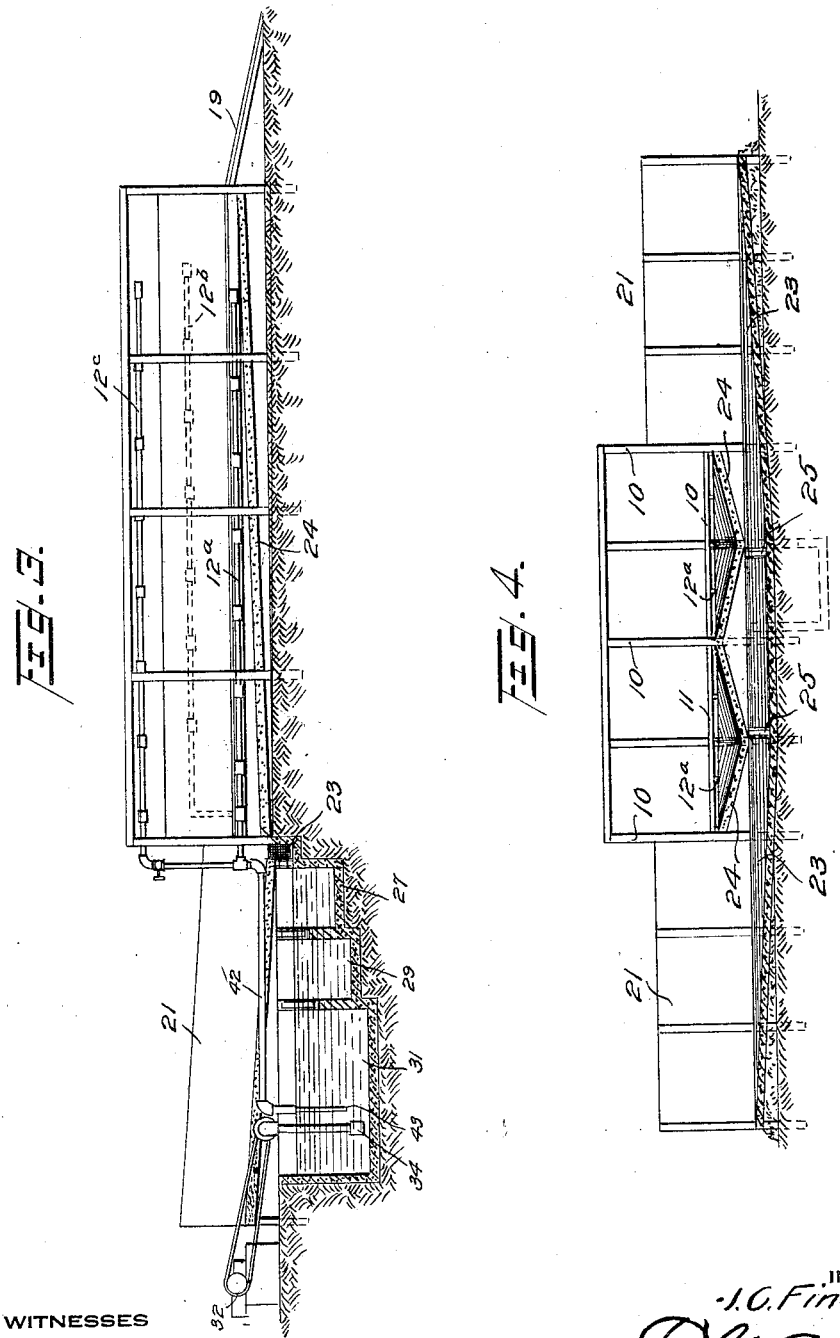

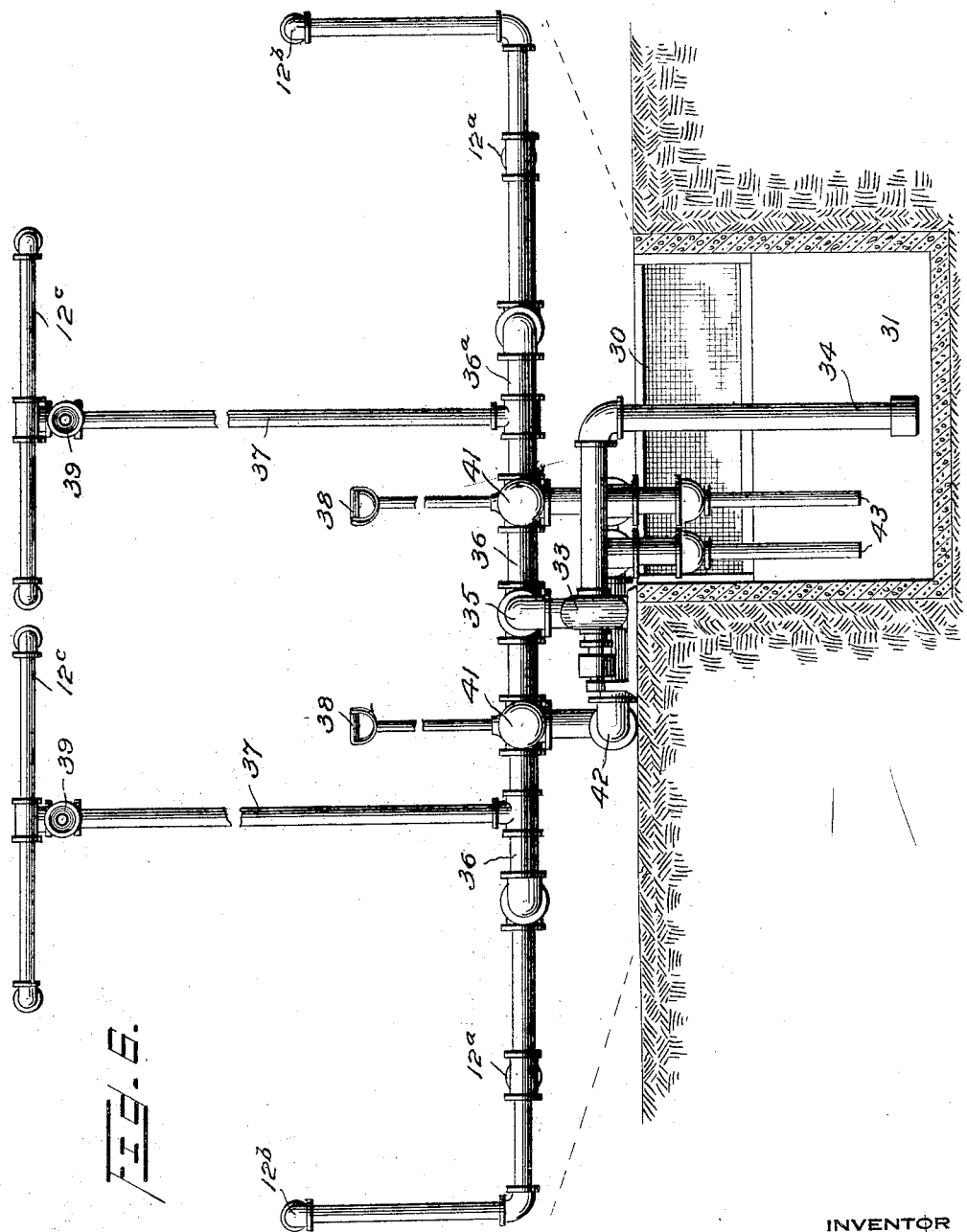

Patented Oct. 14, 1924.

1,511,450

UNITED STATES PATENT OFFICE.

JAMES CHRICHARD FINDLAY, OF SAN FRANCISCO, CALIFORNIA.

SPRAYING APPARATUS FOR LIVE STOCK.

Application filed April 15, 1920, Serial No. 374,193. Renewed January 11, 1924.

*To all whom it may concern:*

Be it known that I, JAMES C. FINDLAY, a subject of the King of Great Britain, residing at San Francisco, in the county of San Francisco and State of California, have invented a new and useful Spraying Apparatus for Live Stock, of which the following is a specification.

This invention relates to apparatus for spraying live stock for the purpose of treating skin diseases and destroying parasites.

By long practical experience, I have found that for a live stock spraying apparatus to be commercially practicable, it is necessary: (1) to provide a certain type of spray; (2) to save the spraying or "dipping" fluid and use it over and over again; (3) to filter the dipping fluid before it is returned to the nozzles; (4) to maintain a constant agitation of the dipping fluid.

In an application filed of even date herewith, Serial No. 374,192, I have described and claimed a nozzle which will deliver the proper spray necessary when working with live stock. In the apparatus of the present invention, I have provided means by which the three latter-named desiderata are accomplished.

The objects of the present invention are to provide a practical spraying system for live stock which will be so made that it can be kept in continuous operation, which is provided with an elaborate screening system to prevent choking of the nozzles, and in which a constant agitation of the fluid is maintained.

Additional objects are to provide a spraying system whose sprays may be controlled by one man, and which requires a minimum of labor to run the same while at the same time having a very large daily capacity.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Fig. 1 is a perspective view showing the interior of one of the spraying pens.

Fig. 2 is a top plan view of the improved apparatus forming a complete spraying system.

Fig. 3 is a longitudinal sectional view somewhat diagrammatic of the apparatus shown in Fig. 2.

Fig. 4 is a transverse sectional view similar to Fig. 3.

Fig. 5 is a view on an enlarged scale with parts in section illustrating the piping arrangement and the means for agitating and screening the dipping fluid.

Fig. 6 is an elevation of the piping as viewed from the left side of Fig. 5.

The improved apparatus, which forms the subject-matter of the present application, comprises a plurality of spraying pens preferably arranged adjacent each other, the spraying means associated with each pen, a draining pen leading off from one end of each spraying pen, means for forcing insecticide or the like to the spraying means, means for catching the sprayed fluid as well as the fluid which drips off the animals' bodies in the draining pens, means for screening the used spraying fluid, and means for agitating the fluid.

The spraying pens, of which there should be at least two in number, as shown in Fig. 2, comprise side walls 10, a slatted floor 11, means by which the animals may enter at one end and go out at the other, and piping associated therewith for spraying the animals in the pen. This pipe, as seen in Fig. 1, comprises side wall pipes $12^b$ and overhead pipes $12^c$, similar pipes $12^a$ being located under the slatted floor as seen in Fig. 5. The pipes $12^b$ are supported from hangers 13 on the walls, while the pipes $12^c$ are carried by hangers 16 provided on a framework 15 of any convenient design, the framework 15 being an open one and the pen itself being open at the top to facilitate driving of the sheep or other animals.

Nozzles 14 are provided at convenient intervals on the pipes $12^a$, $12^b$ and $12^c$. The nozzles connected with pipes $12^a$ are joined thereto by connecting pipes passing up between the slats of the floor 11. All the nozzles 14 are preferably conical, as shown. The nozzles fed by pipes 12ᵃ rest directly on the slatted floor 11 and because of their conical shape the spray from the same is not stopped by the hoofs of the animals. If one of the animal's hoofs is placed upon such a nozzle, it will find no resting place thereon and will slide off the nozzle and back to the slatted floor again. Thus it is seen that while the spraying means is located wholly above the floor, it will not be choked or stopped up by reason of the passage of the animals over the floor.

As seen in Fig. 2, one end wall 17 of each spraying pen has a closure 18 and a platform 19 provides convenient access from the ground to the spraying pens when the doors 18 are open. The opposite ends of the spraying pens have doors 20 opening into draining pens 21. The draining pens have exit doors 22 at convenient points. These draining pens have a floor sloping toward a ditch 23 and the ditch slopes in the direction of the spraying pens. The slope of this ditch is clearly shown in Fig. 4. The pipes 12ᵃ are underneath the slatted floor 11 but above an under-floor 24. This under-floor, as Figs. 3 and 4 illustrate, slopes from the forward or entrance end of each spraying pen to the rear end, where the ditch 23 is provided. The under-floor of each pen slopes also toward the middle from each side so as to form a channel which will permit ready flow of the spraying fluid from all parts of the spraying pen down to the ditch 23. Vertical screens 25 arranged in pairs slidably mounted in guides are set in the ditch 23 so as to catch much of the dirt that would otherwise be carried by the fluid in the course of its flow to the settling tanks. These screens 25 are so placed that the flow of fluid from either spraying pen or from either draining pen will be in effect filtered, (Fig. 4).

Reference should now be made to Figs. 5 and 6. In Fig. 5, one of the screens 25 is shown in the ditch 23. This screen is of coarse mesh to catch only the coarser hairs, dirt, etc., which will be washed off by the spray. The ditch 23 has an opening centrally thereof leading to a settling tank 27, and a second pair of screens 26 is set in this opening and held vertically in slotted guides; thus the fluid is cleaned for a second time before it can flow into the first settling tank 27. A second settling tank 29 of greater dimensions than the first settling tank 27 is provided alongside thereof and a suitable passageway is formed in the wall between the two tanks, so that the flow of the fluid is cut off except through this passageway. A pair of screens 28 of finer mesh than the screens 26 is set in the passageway between the two settling tanks and subjects the fluid passing into the larger settling tank to a further purification. A sump 31 is built adjacent the larger settling tank 29 and a pair of screens 30 of fine mesh is secured in the passageway between the sump and settling tank. Each pair of screens 30, 28, 26 and 25, has its upper end approximately flush with the top of the settling tanks and ditch. The screens of any of these pairs may be removed separately for cleaning; thus there is always one screen interposed between the various compartments of the fluid purification system so that the dipping fluid is subjected to a very thorough screening process. The mesh of the coarsest screens 25, which are nearest the spraying pens, is about three-eighths of an inch, while the mesh of the finest screen, the one adjacent the sump, should be about one-sixteenth of an inch.

An engine 32 of any suitable type is connected with a pump 33, here shown as a centrifugal pump, though a reciprocating pump might be used. A suction pipe 34 extends to near the bottom of the sump and connects with the pump. A pressure line 35 leads off from the pump and is connected at the other end with a header 36 extended transversely of the rear of the spraying pen. If there are two of these spraying pens, there will be two branches 36ᵃ leading off from this header, which branches are connected with the pipes 12ᵃ and 12ᵇ that have been described. Vertical pipes 37 connected with the header lead to the overhead pipes 12ᶜ, and valves 39 are provided in said pipes 37 so that the flow of spraying fluid from the overhead nozzles may be controlled independently of the flow through the side and floor nozzles. It will be clear that there will be as many of these vertical pipes 37 as there are spraying pens.

A pair of three-way valves 41 is provided on the header 36, which three-way valves are controlled by extension handles 38. A platform 40 may be provided upon which the operator will stand to control the valves 39 and the three-way valves 41 by means of their handles 38. The three-way valves each lead to a by-pass pipe 42 having a reduced discharge end 43. The arrangement is such that the pump always discharges a portion of the fluid of the pressure line 35, back through one of the by-passes 42 into the sump. The reduced end 43 raises considerably the pressure of the fluid returned through the by-pass and causes a violent agitation of the fluid in the sump, so that the suction line 34 will draw up a fluid which is substantially homogeneous at all times. This by-pass I consider an important part of the invention, inasmuch as it enables the work to be continuous. The pump can be kept in continuous operation until the work is completed, even when the valves controlling the flow from the nozzles are closed.

The apparatus so far described is preferably used in the following manner. One of the pens will be filled with the live stock to be sprayed, then the operator turns on the bottom and side sprays by operating one of the three-way valves 41. At first the animals are excited and attempt to move about, but after a few seconds they get used to it and the top sprays are turned on. It will be readily understood that the backs of the animals are more easily sprayed than the underneath parts thereof; consequently the underneath sprays are allowed to play upon the animals for a longer period. The floor 11, as Fig. 5 shows, is composed of slats so shaped that the fluid freely trickles down between the slats and any dirt brought in by the animals is not retained by the slats but passes out from the pen along with the fluid. The dipping fluid runs down the inclined under-floor 24 and into the ditch 23. The screens 25 remove a large part of the dirt from the fluid as it moves toward the first settling tank. The screens 26 and 28 further aid in the purification and the settling tanks allow suspended matter to be deposited therein. When the fluid gets back into the sump from which it started, it is maintained in a state of violent agitation by the discharge of the by-pass and is sucked up by the pump to be circulated through the system over and over again. From time to time one of the screens of each pair will be removed and cleaned so that the flow of the fluid will be an unobstructed one.

Some of the advantages of the present apparatus will now be given. (1) There is no difficulty in running the animals into the dipping pen. It is a more humane process to drive them quietly into a spraying pen, and it is more easy on the men than to force the animals through a swimming vat as is the present practice. (2) Only three or more men are required to operate the entire spraying system and pens. The animals can be sprayed in large lots, and while one pen is spraying a batch of animals the other pen will be filling or emptying, as the case may be. (3) The animals do not suffer either from direct or indirect after effects. In the swimming vat system, the animals, when immersed, will swallow some of the dipping fluid which poisons the system to a greater or less degree, with the result that the animals are given a setback in their growth for a varying length of time. (4) The elaborate screening arrangement filters the dipping fluid of all dirt, loose hairs, etc., and returns the fluid to the mixing tanks in practically the same condition as when first mixed. (5) The constant agitating of the dipping fluid in the sump eliminates any chance of sediment in the dipping fluid settling to the bottom of the sump, thereby making the fluid weaker than it should be. In the swimming vat system much manual labor is required to keep the liquid agitated.

It will be obvious that many departures might be made from the precise apparatus which has been disclosed. In certain climates a heating system for heating the dipping fluid might be desired. The number of the screens may be varied at will, as well as the number of spraying and draining pens. The apparatus can be utilized for "dipping" cattle, sheep, hogs and any other live stock, and one pen may be used for sheep or hogs and the alternate pen used for cattle. A plant operated and constructed in accordance with this invention will handle as many as 3,000 sheep an hour or 400 sheep every eight minutes. In actual practice 40,000 sheep have been put through such a plant without it becoming necessary to clean out the mixing tank, showing the system to be economical in its use of spraying solution.

What is claimed is:

1. In a livestock spraying apparatus, a spraying pen having a floor with openings therein, a pipe underneath the floor and having connections at intervals passing up through the openings, and conical nozzles secured to the pipe connections and resting directly on the floor and projecting above the latter.

2. In a livestock spraying apparatus, a spraying pen having a slatted built-in floor, a pipe underneath the slatted floor and having connections at intervals passing up between the slats, and conical nozzles secured to the pipe connections and projecting above the slatted floor whereby the hoof of an animal may not be planted squarely on said nozzle to close the same.

3. In a livestock spraying apparatus, a plurality of spraying pens having entrances at one end and exits at the other end, a draining pen leading off from each exit, a ditch between the pens, said spraying pens having floorings sloped to deliver the sprayed fluid to the ditch, said draining pens also having floors built to run the fluid to the ditch, means for screening the fluid in the course of its flowing through the ditch, and means for returning the screened fluid to the spraying pens.

4. In a livestock spraying apparatus, a plurality of spraying pens each having a floor with openings, spraying means located at the top, bottom and sides of the pens, said pens having entrances at one end and exits at the other end, a draining pen leading off from each exit, each draining pen communicating with one of the spraying pens, a ditch arranged transversely between the spraying pens and draining pens and in a plane below the same, said spraying and draining pens having floorings sloped to deliver the sprayed fluid to the ditch, means connected with the ditch to screen and purify the liquid delivered thereto, and means for delivering the screened fluid to the spraying means in said spraying pens.

5. In livestock spraying apparatus, a plurality of spraying pens having entrances and with exits at the outer corner thereof, a plurality of spaced draining pens each communicating at the inner corner thereof with one of the spraying pens through one of the exits, a door for each of said exits, a ditch located transversely of and between and below the spraying pens and the draining pens, means for collecting the sprayed liquid from said pens and discharging it into the ditch, means for screening the liquid, and means for returning the screened liquid to the spraying pens, the means for screening and the means for returning being located in the space separating the draining pens.

6. In a livestock spraying apparatus, a spraying pen, a ditch, means for collecting the sprayed fluid in the ditch, means in the ditch for partially purifying the flowing fluid, a settling tank directly communicating at the top with the ditch, means for further cleansing the fluid as it passes from the ditch to the settling tank, a sump directly communicating with the upper portion of the settling tank, means for still further removing impurities from the fluid as it passes from the tank into the sump, and means for pumping the fluid from the sump back to the spraying pen.

7. In a livestock spraying apparatus, a spraying pen, a sump, means for forcing spraying fluid from the sump to the pen, means for collecting the sprayed fluid and purifying the same and then delivering it to the sump, and means for agitating the fluid in the sump, consisting of a pipe in continuous communication with the fluid forcing means through a by-pass, and receiving a portion of the fluid therefrom and discharging it into the sump.

8. In a livestock spraying apparatus, a spraying pen, a sump, means for forcing spraying fluid from the sump to the pen including a pressure line, a suction line, and a pump, means for collecting the sprayed fluid and purifying the same and then delivering it to the sump, and means for diverting a part of the fluid under pressure and leading it back to the sump to agitate the fluid therein, said means consisting of a pipe in continuous communication with the pressure line through a by-pass and discharging below the level of the liquid in the sump.

9. In a livestock spraying apparatus, a spraying pen, a sump, means for forcing spraying fluid from the sump to the pen, means for controlling or shutting off the flow to the pen, means for collecting the sprayed fluid and running it back to the sump, and means for agitating the fluid in the sump by the fluid under pressure, the entire flow of the fluid uncontrolled passing back to the sump when the flow to the pen is shut off.

10. In a livestock spraying apparatus, a spraying pen, means for holding a supply of spraying fluid, pipes leading to said pen, spraying means within the pen connected to said pipes, a header to which said pipes are connected outside the pen, a three-way valve provided in the header, a pump connected to the header, a by-pass leading off from said three-way valve and back to the supply holding means whereby the fluid therein is agitated, the by-pass conducting fluid at all times when there is a pressure and the pipes conducting fluid when said valve is in a certain position.

11. In a livestock spraying apparatus, a spraying pen, pipes leading to said pen, spraying means within the pen connected to said pipes, a header to which said pipes are connected outside the pen, a three-way valve provided in the header, a pump connected to the header, a by-pass leading off from said three-way valve, the by-pass conducting fluid at all times when there is a pressure, the pipes conducting fluid when said valve is properly positioned, means for holding a supply of the fluid, and means for delivering fluid from the supply holding means to the header, the by-pass leading the fluid from the header back to the supply holding means, said by-pass raising the pressure of the fluid passing through it and agitating the fluid in the supply holding means.

12. In a livestock spraying apparatus, a spraying pen, spraying means, and means for collecting and purifying the sprayed fluid, the latter means including a ditch located below the pen and receiving sprayed fluid therefrom, screens set in the ditch, a plurality of settling tanks having communication with each other only near their tops, each successive tank being deeper than the preceding one, the tank nearest the ditch having communication therewith at the top, screens in the passages between the tanks, a sump connecting with the upper part of the last tank, and screens between the sump and the last tank.

13. In a livestock spraying apparatus, a spraying pen, spraying means, and means for collecting and purifying the sprayed fluid, the latter means including a ditch located below the pen and receiving sprayed fluid therefrom, screens set in the ditch, a plurality of settling tanks having communication with each other only near their tops, each successive tank being deeper than the preceding one, and the tank nearest the ditch communicating with the ditch at the top, screens in the passages between the tanks, a sump connecting with the upper part of the last tank, screens between the sump and the last tank, the ditch, the tanks and the sump being located below the ground in line with each other and accessible from the top of the ground.

14. In a livestock spraying apparatus, a plurality of spraying pens, a draining pen leading off from each spraying pen and communicating therewith, and a transverse ditch between and below the pens and extending for the combined width thereof, said spraying pens having floorings sloped to deliver the sprayed fluid to the ditch, said draining pens also having floors built to run the fluid to the ditch.

15. In a livestock spraying apparatus, a spraying pen, means therein for spraying animals, a ditch, means for collecting the sprayed fluid and conveying it to the ditch, means within the ditch for screening the fluid, settling tanks in communication with each other and said ditch, a sump connecting with the last tank, and means for supplying the spraying means with the purified fluid from the sump.

16. In a livestock spraying apparatus, a spraying pen, means therein for spraying animals, a sump, means for collecting the sprayed fluid from the spraying pen, and delivering it to the sump, said last-named means including means for screening and purifying the sprayed fluid, a pump, a pipe for connecting the pump to the sump, a pressure line leading from the pump to the spraying means, a by-pass pipe leading from the pressure line to the sump, and a valve in the pressure line beyond the connection of the by-pass pipe with the pressure line, whereby the pump always discharges a portion of the fluid under pressure back through the by-pass pipe into the sump.

17. In a livestock spraying apparatus, a plurality of spraying pens arranged close together, spraying means therein, a plurality of draining pens spaced apart, the draining pens each communicating with the spraying pens at one point and offset therefrom, a ditch located below the plane of the pens and between the same, means for collecting the sprayed fluid from the spraying pens and the fluid from the draining pens and discharging the same into the ditch, means for screening and purifying the fluid from the ditch and forcing the purified fluid back to the spraying means of the spraying pens, said screening, purifying and forcing means being located in the space between the draining pens.

18. In a livestock spraying apparatus, a plurality of spraying pens open at the top, a plurality of draining pens communicating with the spraying pens, spraying means in the spraying pens, a header located at one end of the spraying pens and connected with the spraying means, a vertical pipe, one for each spraying pen, extending vertically from the header, overhead pipes leading from the vertical pipes and supported above the open tops of the spraying pens, valves in the vertical pipes, a pressure line pipe connected to the header, three-way valves provided on the header between the connection of the pressure line pipe and the connection of the vertical pipes, and a pump from which the pressure line pipe leads.

19. In a live stock spraying apparatus, a spraying pen open at the top, a header located at one end of the spraying pen, a spraying means within the spraying pen and connected with the header, a vertical pipe extending from the header, substantially horizontal overhead pipes leading from the vertical pipe and supported along and above the open top of the spraying pen and carrying spraying means, a valve for the vertical pipe, a pressure line pipe connected to the header, a three-way valve provided on the header, a pump from which the pressure line pipe leads, a bypass leading off from the pressure line pipe, means for holding a supply of spraying fluid, and a pipe leading from the bypass back to the supply-holding means.

20. In a live stock spraying apparatus, a spraying pen having a floor with openings, spraying means located at the top, bottom and sides of the pen, said pen having an entrance at one end and an exit at the other, a draining pen leading off from said exit, a ditch arranged in a plane below the spraying pen, said spraying pen and draining pen having floorings sloped to deliver the sprayed fluid to the ditch, means connected with the ditch to screen and purify the liquid delivered thereto, means for holding a supply of spraying fluid, means for delivering the screened and purified fluid from the ditch to the supply holding means, a pump communicating with the supply holding means, and means connecting the pump with the spraying means.

In testimony that I claim the foregoing as my own, I have hereto affixed my signature.

JAMES CHRICHARD FINDLAY.